United States Patent
De Boer et al.

(10) Patent No.: US 7,537,390 B2
(45) Date of Patent: May 26, 2009

(54) ROLLING BEARING ARRANGEMENT

(75) Inventors: Johannes De Boer, Üchtelhausen (DE); Bernhard Wilm, Nüdlingen (DE)

(73) Assignee: FAG Kugelfischer AG (DE)

( * ) Notice: Subject to any disclaimer, the term of this patent is extended or adjusted under 35 U.S.C. 154(b) by 691 days.

(21) Appl. No.: 11/217,869

(22) Filed: Sep. 1, 2005

(65) Prior Publication Data
US 2006/0051006 A1 Mar. 9, 2006

(30) Foreign Application Priority Data
Sep. 8, 2004 (DE) .................. 10 2004 043 351

(51) Int. Cl.
*F16C 19/38* (2006.01)
(52) U.S. Cl. ............ 384/504; 384/506; 384/539; 384/585
(58) Field of Classification Search ............ 384/499, 384/504, 506, 539, 585
See application file for complete search history.

(56) References Cited

U.S. PATENT DOCUMENTS

| 1,543,135 | A | * | 6/1925 | Vincon ............... 384/504 |
| 4,749,288 | A | * | 6/1988 | Tilch et al. ........... 384/584 |
| 5,492,419 | A |   | 2/1996 | Miller et al. ......... 384/551 |

FOREIGN PATENT DOCUMENTS

| DE | 42 22 852 A1 | 1/1994 |
| DE | 199 61 712 A1 | 7/2001 |

\* cited by examiner

*Primary Examiner*—William C Joyce
(74) *Attorney, Agent, or Firm*—Ostrolenk, Faber, Gerb & Soffen, LLP

(57) ABSTRACT

A rolling bearing arrangement comprising at least two annular rows of bearing rolling bodies, a first inner ring and a second inner ring next to and coaxial with the first inner ring and a snap ring connecting the inner rings to one another. The snap ring has a radially inwardly projecting first engagement element at the first inner ring and a radially outwardly projecting second engagement element at the second inner ring. Radial depressions in the first and second inner rings receive respective engagement elements. The first engagement element engages into the first depression radially in the direction toward the axis of rotation of the rolling bearing arrangement. The second engagement element engages into the second radial depression radially away from the axis of rotation. Free inner spacing inside each inner ring, with one inner spacing nearer to the axis of rotation than the other inner spacing.

8 Claims, 1 Drawing Sheet

ROLLING BEARING ARRANGEMENT

FIELD OF THE INVENTION

The invention relates to a rolling bearing arrangement having at least two rows of rolling bodies and having a first inner ring and a second inner ring adjacent the first inner ring. The inner rings are connected positively to one another by a snap ring. For this purpose, the snap ring has at least one radially projecting first engagement element and at least one radially projecting second engagement elements. Each of the engagement elements engages into a corresponding radial first depression and into a radial second depression on the respective inner ring.

BACKGROUND OF THE INVENTION

A rolling bearing arrangement of this type is described in U.S. Pat. No. 5,492,419 which is an illustrative tapered roller bearing. The snap ring is a securing element, which holds an axial spacer disk in position and secures it between the inner rings. At the same time, the snap ring holds sealing elements in position.

The invention also relates to rolling bearing arrangements, in which individual parts consisting of two rows of rolling bodies held in cages and with inner rings are preassembled into a structural unit and are captively secured to one another by the snap ring. Particularly in the case of heavy motor vehicles, the axle journals on which the inner rings of the rolling bearing arrangement are seated are designed with stepped diameters. Correspondingly, the inner rings of a pairing in the rolling bearing arrangement have, with respect to one another, different nominal dimensions of the usually internally cylindrical seat for the shaft or journal. The arrangements in the prior art are relatively complicated and are not suitable for pairings of inner rings with substantial differences in the average diameter of the shaft seats with respect to one another.

SUMMARY OF THE INVENTION

The object of the invention is, therefore, to provide a rolling bearing arrangement of the above general type which can be produced and, in particular, assembled simply and cost-effectively and which is suitable for bearing seats with substantial differences in the average diameter of the shaft seats.

According to the invention, the object is achieved in that the snap ring partially surrounds the first ring radially, at least at the first depression, in such a way that the first engagement element engages into the first depression radially from the outside inward. Moreover, the second inner ring partially surrounds the snap ring radially such that the second engagement element engages into the second radial depression radially from the inside outward.

The invention may be applied to rolling bearing arrangements with two rows or multiple rows rolling bearings. The adjacent inner rings are held against one another by a snap ring for reasons of simplified assembly and reliable transport. The rolling bearing arrangement is thus a transportable self-contained unit comprised of at least two rolling bearings. A rolling bearing arrangement of this type may be formed from the rows of rolling bodies with or without a cage, from one or more outer rings, and from inner rings connected to one another by means of a snap ring. Alternatively, the unit is formed from the inner rings connected to one another by a snap ring and from the rows of rolling bodies held in the cages. The outer rings or the outer raceways of the rolling bearing are in this case arranged separately. The rolling bodies are either balls or, preferably, are rollers, in particular tapered rollers, of a two-row or a multiple row tapered roller bearing. The invention has particular application for use in wheel mountings of vehicles.

The inner rings have radial depressions in the vicinity of the end faces facing one another. The depressions thus extend from the surface on the portion of the inner ring radially either, on an inner contour, as seen from the axis of rotation, radially away from the axis of rotation into the inner ring or, on an outer contour, radially in the direction of the axis of rotation into the material of the inner ring. In this case, as an embodiment of the invention provides, preferably the first depression on the first inner ring is introduced radially from outside and the second depression on the second inner ring is introduced radially from inside.

The respective depression/engagement element pairing is alternatively formed by individual bosses circumferentially adjacent to one another and by corresponding individual depressions in the surface of the inner ring. Alternatively, the individual bosses engage into a common annular groove. According to one embodiment of the invention, the respective engagement element is an individual boss or collar running annularly about the axis of rotation in a closed manner or else running around, interrupted circumferentially at least once. In this case, the depression/engagement element pairing is formed by the boss and an annular groove on the respective inner ring.

The elastically deformable snap ring preferably is comprised of plastic, but also, alternatively, of metal, for example of spring steel, and is prestressed radially against the inner rings. One of the materials which can be used is polyamide reinforced with glass fibers or carbon fibers. The snap ring has elastic regions, at least on the engagement elements, so that, when the snap ring is pushed axially onto the respective inner ring, the engagement elements spring up or in radially until the engagement elements snap into the corresponding depression. The positive connection thus produced between the inner rings is at least so secure that, when the rolling bearing is pushed onto a bearing seat, one of the inner rings can be pushed ahead by the other inner ring via the snap ring, without the positive connection coming loose. The positive connection is also so firm that, when the unit is pulled off from the shaft seat, one of the inner rings can be pulled along by the other inner ring via the snap ring, without the positive connection coming loose.

The invention relates particularly to rolling bearing arrangements with rolling bearings having dimensions different from one another, for example rolling bearing arrangements which are seated on stepped shaft portions. The inner rings, on the inside, or the shaft portions, on the outside, have average diameters which, in size, have substantial differences from one another. This applies particularly to cylindrical shaft seats of different diameters, but also to conically or otherwise designed seats. Correspondingly, the free inner spacing, radially furthest away from the axis of rotation, between the axis of rotation and a first inner contour, facing the axis of rotation, of the first inner ring lies nearer to the axis of rotation than the free inner spacing, radially nearest to the axis of rotation, between the axis of rotation and a second inner contour, facing the axis of rotation, of the second inner ring. The substantial difference between the smaller average inside diameter and the larger average diameter corresponds to double the radial overall height of the snap ring at its thickest point.

Other features and advantages of the present invention will become apparent from the following description of the invention which refers to the accompanying drawings.

DETAILED DESCRIPTION OF A PREFERRED EMBODIMENT OF THE INVENTION

Figure 1:
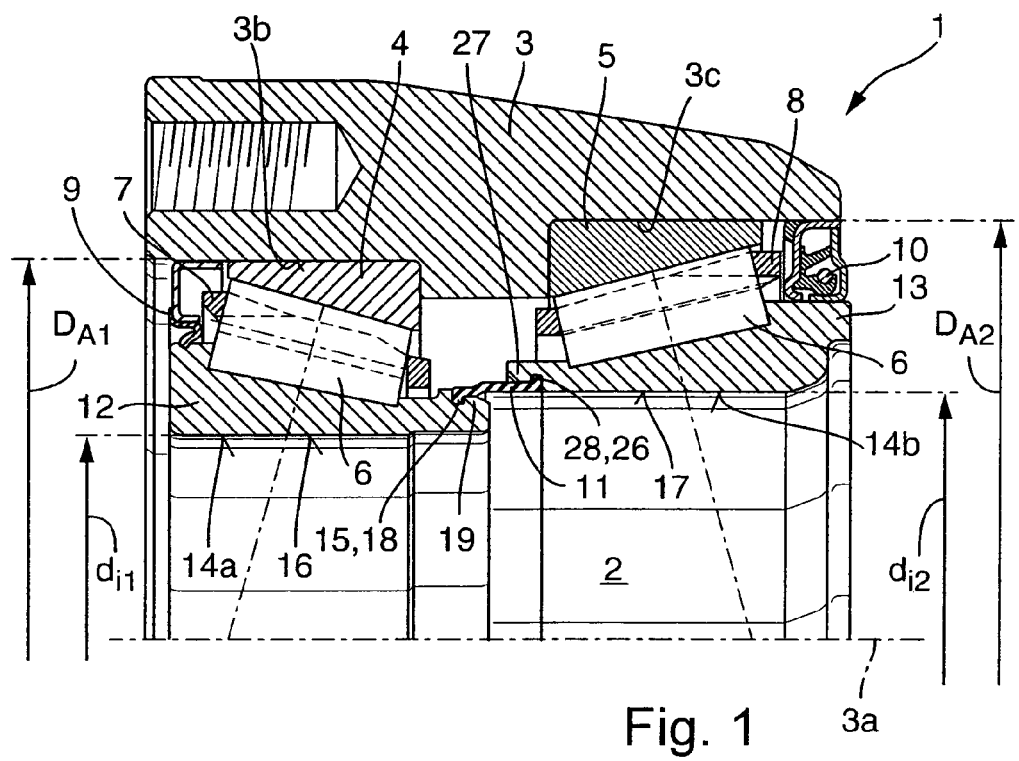
FIG. 1 is a cross section of a fragment of a bearing including the invention.

The invention is explained below by an exemplary embodiment. FIG. 1 shows a wheel mount 1 with a rolling bearing arrangement 2 in a wheel carrier 3. The wheel mount 1 is illustrated in a longitudinal section along the axis of rotation 3a of the wheel carrier 3. The wheel mount 1 comprises a first outer ring 4, a second outer ring 5, two rows of rolling bodies 6 illustrated here as tapered rollers, respective cages 7 and 8 at each row, seals 9 and 10 radially outward of each row, and a snap ring 11 connecting respective inner rings 12 and 13 at each row. The tapered roller bearings are prestressed relative to one another in an O-arrangement and are sealed off in each case by one of the seals 9 or 10. A respective row of rolling bodies 6 is arranged on each of the inner rings 12, 13. The rolling bodies 6 of each row are held radially and axially by a respective one of the cages 7 and 8. The inner rings 12 and 13 are held against one another by the snap ring 11 between the rings, so that, even without outer rings 4 and 5, the rolling bearing arrangement 2 is a self-contained mountable subassembly.

The nominal diameters of the housing bore DA1 and shaft seat di1 of the first tapered roller bearing with the outer ring 4 and with the inner ring 12 are smaller than the nominal diameters of the housing bore DA2 and shaft seat di2 of the second tapered roller bearing with the outer ring 5 and with the inner ring 13. The first outer ring 4 is seated firmly in the housing bore 3b of the wheel carrier 3 with the nominal diameter $D_{A1}$. The second outer ring 5 is seated in the larger housing bore 3c with the nominal diameter $D_{A2}$. $d_{i1}$ is the (average) (nominal) diameter of the shaft seat 14a of the first inner ring 12 which is to be seated on an axle stub, not illustrated. di2 is the corresponding nominal diameter of the second shaft seat 14b for the second inner ring 13.

Accordingly, the free inner spacing (in this case, a radius $d_{i1}/2$), radially furthest away from the axis of rotation 3a, between the axis of rotation 3a and the inner contour 16 of the inner cylindrical surface area of the first inner ring 12 is smaller than the free inner spacing ($d_{i2}/2$), radially nearest to the axis of rotation 3a, between the axis of rotation 3a and the inner contour 17 of the inner cylindrical surface area of the second inner ring 13.

Figure 2:
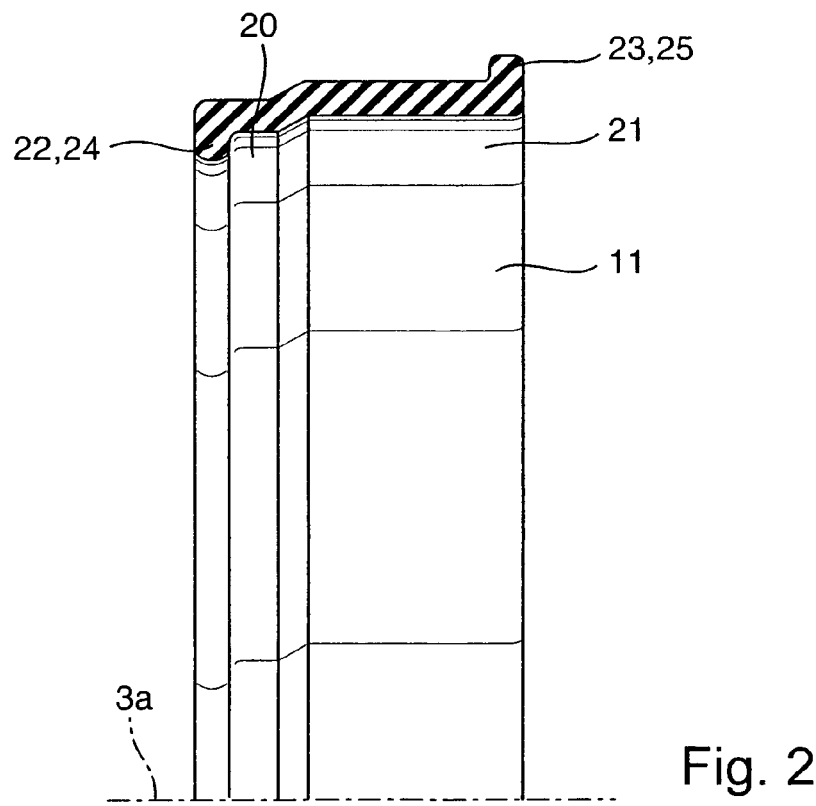
FIG. 2 is an enlarged cross-sectional view of a fragment of a snap ring in the bearing.

FIG. 2 is a partial view of the snap ring 11, as an individual part, taken in a section along the axis of rotation 3a. The snap ring 11 has two rotationally symmetrical, axially separate ring portions 20 and 21. An engagement element 22 is formed on the first ring portion 20. A second engagement element 23 is formed on the second ring portion 21,. Each engagement element is in the form of an annular boss 24 and 25 running around the axis of rotation 3a and projecting radially from the snap ring 11. The first boss 24 projects from the first ring portion 20 radially in the direction of the axis of rotation 3a of the rolling bearing arrangement 2. The second boss 25 projects from the second ring portion radially away from the axis of rotation 3a.

Each inner ring 12, 13 has a respective depression 15 and 28 in the form of a respective annular groove 18 and 26. The annular groove 18 is formed radially on the outside of the inner ring 12 and is delimited in the direction of the second inner ring 13 by a peripheral rim 19. The snap ring 11 partially surrounds the first inner ring 12 radially, from the axis of rotation 3a, by the ring portion 20 at the first depression 15, in such a way that the first boss 24 engages radially from the outside inwards, and is prestressed in this direction into the annular groove 18. The annular groove 26 is formed radially outwardly and located on the inside of the inner ring 13. It is delimited in the direction of the first inner ring 12 by a peripheral rim 27. The second inner ring 13 surrounds the snap ring 11 on the second ring portion 21 such that the boss 25 engages radially from the inside outward, and is prestressed in this direction, into the second depression 28 and therefore into the annular groove 26. The snap ring 11 retains the inner ring 12 axially with respect to the inner ring 13 at the rim 19 by the boss 24, so that the boss 24 engages axially behind the rim. The inner ring 13 is connected axially to the inner ring 12 by the snap ring 11, so that the boss 25 engages axially behind the rim 27.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rolling bearing arrangement comprising
   at least two annular rows of bearing rolling bodies which are operable to roll around an axis of rotation of the arrangement;
   a first inner ring for a first row of the rolling bodies, the first inner ring having a first inner surface with a first inner diameter, the first inner ring further comprising a first radial depression;
   a second inner ring for a second row of the rolling bodies, the second inner ring being coaxial with the first inner ring and being positioned next to the first inner ring in a direction of the axis of rotation, the second inner ring having a second inner surface with a second inner diameter, the second inner surface being distanced from the first inner surface in the direction of the axis of rotation and the second inner diameter being greater than the first inner diameter, the second inner ring further comprising a second radial depression;
   a snap ring connecting the inner rings to one another, the snap ring having at least one radially projecting first engagement element at the first inner ring and at least one radially projecting second engagement element at the second inner ring, the first engagement element engaging into the radial first depression in the first inner ring radially in a direction toward the axis of rotation and the second engagement element engaging into the radial second depression in the second inner ring in a direction radially away from the axis of rotation.

2. The rolling bearing arrangement as claimed in claim 1, wherein the first depression is open radially toward the snap ring in the direction radially away from the axis of rotation of the rolling bearing arrangement, and the second depression is open radially toward the snap ring in the direction radially toward the axis of rotation.

3. The rolling bearing arrangement as claimed in claim 1, wherein the first inner ring includes a first outer surface, the first radial depression being formed radially at the first outer surface of the first inner ring, and the second inner ring includes a third inner surface, the second depression being formed radially at the third inner surface of the second inner ring.

4. The rolling bearing arrangement as claimed in claim 3, wherein the snap ring is elastically deformable and is prestressed radially against the first and the second inner rings.

5. The rolling bearing arrangement as claimed in claim 1, wherein the first inner ring has a first inner contour and a first free inner spacing located radially between the axis of rotation and the first inner ring contour, and the second inner ring has a second inner contour and a second free inner spacing located radially between the axis of rotation and the second inner contour, the first free inner spacing lying nearer to the axis of rotation than the second free inner spacing.

6. The rolling bearing arrangement as claimed in claim 5, wherein the first inner contour of the first inner ring is formed by the first inner surface, and the second inner contour of the second inner ring is formed by the second inner surface.

7. The rolling bearing arrangement as claimed in claim 1, wherein each of the first and the second engagement elements is a respective annular boss running around the axis of rotation and projecting radially from the snap ring, and each of the first and the second depressions is an annular groove in the respective first and the second inner ring.

8. The rolling bearing arrangement as claimed in claim 1, wherein the rolling bodies are tapered rollers.

* * * * *